United States Patent
Ivanovic et al.

(10) Patent No.: US 10,480,795 B2
(45) Date of Patent: Nov. 19, 2019

(54) OVEN DOOR, OVEN COMPRISING AN OVEN DOOR AND METHOD FOR DISPLAYING INFORMATION AT AN OVEN DOOR

(71) Applicant: Electrolux Appliances Aktiebolag, Stockholm (SE)

(72) Inventors: Branko Ivanovic, Rothenburg ob der Tauber (DE); Mirjam Meissner, Rothenburg ob der Tauber (DE); Dietmar Hildner, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 407 days.

(21) Appl. No.: 15/316,856

(22) PCT Filed: Jul. 24, 2015

(86) PCT No.: PCT/EP2015/066991
§ 371 (c)(1),
(2) Date: Dec. 7, 2016

(87) PCT Pub. No.: WO2016/012589
PCT Pub. Date: Jan. 28, 2016

(65) Prior Publication Data
US 2017/0122568 A1    May 4, 2017

(30) Foreign Application Priority Data
Jul. 25, 2014 (EP) .................................... 14178551

(51) Int. Cl.
*F24C 7/08* (2006.01)
*F24C 15/04* (2006.01)
(Continued)

(52) U.S. Cl.
CPC ............ *F24C 7/082* (2013.01); *F21V 23/008* (2013.01); *F21V 33/0044* (2013.01);
(Continued)

(58) Field of Classification Search
CPC ........ F24C 15/04; F24C 15/006; F24C 7/082; F21V 23/008; F21V 33/0044
(Continued)

(56) References Cited

U.S. PATENT DOCUMENTS 6,212,805 B1 * 4/2001 Hill .................... B44F 1/066
40/442
2004/0221839 A1 * 11/2004 Plankl ................. F24C 15/2064
126/299 D
(Continued)

FOREIGN PATENT DOCUMENTS

DE    10064742 A1    6/2002
DE    10347763 A1    5/2005
(Continued)

OTHER PUBLICATIONS

International Search Report and Written Opinion issued in PCT/EP2015/066991 dated Jan. 26, 2016, 15 pages.
(Continued)

*Primary Examiner* — Avinash A Savani
*Assistant Examiner* — Aaron H Heyamoto
(74) *Attorney, Agent, or Firm* — Perne & Gordon LLP

(57) ABSTRACT

The invention relates to an oven door (10) for closing a cavity (2) of an oven (1) comprising a door window (11) being at least partially transparent for enabling a user to look into the oven cavity (2), wherein the door window (11) comprises at least one printing (12), the printing (12) being made of an ink comprising scattering components, said ink being transparent and wherein the oven door (10) is adapted to provide light to the printing (12) by at least one light
(Continued)

source (13) such that said light is scattered by the scattering components of said printing (12) thereby implementing an optical user interface for displaying information at the door window (11).

23 Claims, 2 Drawing Sheets

(51) Int. Cl.
    *F21V 8/00*           (2006.01)
    *F21V 23/00*         (2015.01)
    *F21V 33/00*         (2006.01)
    *F24C 15/00*         (2006.01)
    *F21Y 113/17*       (2016.01)
    *F21Y 115/10*       (2016.01)

(52) U.S. Cl.
    CPC ............ *F24C 15/006* (2013.01); *F24C 15/04* (2013.01); *G02B 6/001* (2013.01); *G02B 6/006* (2013.01); *G02B 6/0043* (2013.01); *G02B 6/0085* (2013.01); *G02B 6/0095* (2013.01); *F21Y 2113/17* (2016.08); *F21Y 2115/10* (2016.08)

(58) Field of Classification Search
    USPC ........................................................ 126/200
    See application file for complete search history.

(56) References Cited

U.S. PATENT DOCUMENTS

| | | | | |
|---|---|---|---|---|
| 2005/0231935 A1* | 10/2005 | Kimmet | ................ | G09F 13/08 362/23.18 |
| 2009/0316385 A1* | 12/2009 | Weber | ................ | F21K 9/00 362/92 |
| 2012/0060822 A1* | 3/2012 | Eberhard | ................ | F24C 15/04 126/198 |
| 2012/0102798 A1* | 5/2012 | Oki | ................ | G02B 6/0043 40/541 |
| 2012/0205449 A1* | 8/2012 | Lewis | ................ | G06K 7/12 235/468 |
| 2013/0319397 A1* | 12/2013 | Braden | ................ | F24C 15/04 126/200 |
| 2013/0333685 A1* | 12/2013 | Jeong | ................ | F24C 15/322 126/21 A |
| 2014/0319124 A1* | 10/2014 | Yamauchi | ............ | F24C 15/2042 219/520 |
| 2015/0353740 A1* | 12/2015 | Kojima | ................ | F21V 19/001 362/296.04 |
| 2018/0245797 A1* | 8/2018 | Johnson | ................ | F24C 15/006 |
| 2018/0372326 A1* | 12/2018 | Park | ................ | H04M 1/72533 |

FOREIGN PATENT DOCUMENTS

| | | |
|---|---|---|
| DE | 102005045367 A1 | 3/2007 |
| DE | 102006053906 A1 | 5/2008 |
| EP | 2551601 A2 | 1/2013 |
| EP | 2752623 A1 | 7/2014 |
| WO | 2008058972 A1 | 5/2008 |
| WO | 2012168647 A1 | 12/2012 |
| WO | 2014102116 A1 | 7/2014 |

OTHER PUBLICATIONS

European Search Report issued in corresponding European Patent Application No. 14178551.9 dated Dec. 12, 2016, 10 pages.

* cited by examiner

OVEN DOOR, OVEN COMPRISING AN OVEN DOOR AND METHOD FOR DISPLAYING INFORMATION AT AN OVEN DOOR

Generally, the present invention relates to the field of food preparation appliances. More specifically, the present invention relates to an oven door comprising a user interface for displaying information, a corresponding oven and a corresponding method of displaying information on an oven door.

BACKGROUND OF THE INVENTION

Ovens for food preparation are well-known in prior art. Said ovens comprise a base body forming an oven cavity with a cavity opening for receiving the food to be prepared. In addition, the oven comprises a door for closing the cavity opening. The oven door acts as thermal barrier to keep the heat energy in the cavity during operation of the oven. Typically, oven doors are at least partially transparent in order to enable the user to control the process of food preparation within the closed cavity. State of the art ovens comprise a user interface located above the oven door and attached to the oven base body for providing information to the user, e.g. baking temperature, baking period etc.

German patent application DE 10 2007 015 237 A1 discloses a baking oven comprising an oven cavity and an oven door for closing the oven cavity. The oven door comprises a lighting unit for illuminating the oven cavity.

SUMMARY OF THE INVENTION

It is an objective of the embodiments of the invention to provide an oven door and an oven with an improved user interface and a corresponding method for displaying information. The objective is solved by the features of the independent claims. Preferred embodiments are given in the dependent claims. If not explicitly indicated otherwise, embodiments of the invention can be freely combined with each other.

According to an aspect of the invention, the invention relates to an oven door for closing a cavity of an oven. The oven door comprises a door window being at least partially transparent for enabling a user to look into the oven cavity. The door window comprises at least one printing that can be made of an ink comprising scattering components. The ink of said printing is essentially transparent. The oven door is adapted to provide light to the printing by at least one light source such that said light is scattered by the scattering components of said printing, thereby implementing an optical user interface for displaying information at the oven door window. The optical user interface provides information in a clear visible way to the user wherein said information is even visible from a large distance, under bad lighting conditions and even during night time.

According to embodiments, the scattering components are reflective particles, specifically ceramic particles. Thereby light provided by the light source is reflected at the reflective surfaces of said particles and thereby at least partially reflected in a direction opposite to the oven cavity. Thereby, the information provided by said printing is visible in front of said oven door when the light source is switched on.

According to embodiments, the printing is adapted such that the information is essentially only visible when the printing is illuminated by said light source. By using an essentially transparent ink, the printing itself is not or essentially not visible when the light source is switched off. When switching on the light source, the printing is getting visible due to the scattered light reflected by the scattering components of the ink.

According to embodiments, the door window comprises at least one door glass pane that comprises said at least one printing and the light of said light source can be coupled into the door window at at least one edge of at least one door glass pane that comprises said at least one printing and the light is guided by said door glass pane to said printing. The light source is preferably placed in close proximity to the printing which has to be illuminated by said light source. When coupling light into the door glass pane, the door glass pane acts as a waveguide and guides said light towards the printing. Thereby, the lighting efficiency of the printing is effectively increased.

It has been found that the ink that comprises scattering components that is used in the present invention has important advantages in several aspects. One advantage is that the ink with the scattering components is surprisingly transparent when it is not lighted by the light source that is provided by the invention and that is adapted to provide light to the printing. In that unlit state it is essentially invisible for a user that looks at the oven door window from some distance. Surprisingly, even when a user has his face closely in front of the oven window and inspects the oven cavity, the ink with the scattering components at least in its unlit state is essentially invisible and does not impair the inspection of the cavity. A further advantage is that the ink with the scattering components provides a surprisingly bright and clear user interface when it is lit by the light source provided by the invention that is adapted to provide light to the printing. It has been found that written information provided by the user interface in its lit state can be read very well even from a distance of several meters. By using coloured light sources an esthetically very attractive user interface can be provided. Wherein, as said the shining and clear user interface can be made to essentially completely disappear by switching off its lighting.

According to embodiments, the door window comprises at least three glass panes, namely an outer glass pane, an inner glass pane and at least one intermediate glass pane arranged between the outer and inner glass pane, wherein the printing is preferably applied to said intermediate glass pane. Thereby, the light source that has to be close to the intermediate glass pane that comprises the printing is shielded effectively from the heat of the oven cavity by the inner glass pane. Thus, an overheating of the light source is avoided.

According to embodiments, at least the intermediate glass pane is releasably secured at a mechanical structure of the oven door. For example, the intermediate glass pane is slidably mounted at a frame of the oven door. Thereby, the intermediate glass pane can be readily removed for cleaning purposes. Thus, with considerable advantage, the intermediate panel that comprises the printing, which can be illuminated to generate a bright optical user interface can completely decoupled from the light source and be easily cleaned just as any conventional glass pane of an oven door that can be removed for cleaning.

According to embodiments, the light source is attached to a mechanical structure of the oven door, for example the frame of the oven door. In case of a releasably secured intermediate glass pane, the light source providing light into said intermediate glass pane may be fixedly installed in order to allow a fixed wiring within the oven door.

According to embodiments, a fixing arrangement for fixing the light source is adapted to be cooled by an air flow flowing along the fixing arrangement. For example, the light source is installed at or within a fixing arrangement comprising rips for dissipating heat or in a housing comprising air inlets for providing an air circulation.

According to embodiments, the light source is cooled by an air stream flowing through the oven door. For example there may be an air-flow provided through the door by means of a fan. Said air-flow may be controlled such that the temperature of the light source is below a temperature threshold value in order to avoid an overheating of said light source.

According to embodiments, the light source comprises a plurality of lighting means being arranged along an edge of the door glass pane. Said lighting means may be any light emitting elements, for example bulbs, light emitting diodes etc. For example, each lighting means may be associated with a certain printing, in order to illuminate said printing. Similarly, a group of lighting means may be associated with one or more printing in order to illuminate said one or more printing.

According to embodiments, the light source is constituted by at least one single-colour or multicolour light emitting diode. A digital programmable light emitting diode can be preferably a LED which offers colour and/or brightness controls etc. For example, a digital programmable multicolour light emitting diode may be controlled by a control unit of the oven according to the oven function or information provided by a sensing element. The at least one LED can preferably have a high temperature resistance, preferably of up to essentially 150° C. Also preferably, at least one LED can be provided with a programmable driver such is per se known in the prior art and that can allow to control the intensity of the light and in the case of a multicolour LED to control the colour of the emitted light.

In favourable embodiments, the light source can be subjected to pulse-width modulation (PWM) such as is per se known in the prior art. In favourable embodiments, the light source may be powered by means of a wireless power charging coil, using a wireless power charging coil such as is per se known in the prior art. For example, a power receiver coil is attached to the oven door and connected to the light sources whereas a power transmitting coil is arranged at the oven base body or oven cavity, preferable at the bottom side of the oven base body or oven cavity. The power transmitting coil may be connected with a power supply of the oven and inductively coupled with the power receiver coil. There may be wireless power transmission between the power transmitting coil and power receiving coil in order to power the light source. Alternatively, the light source is connected to a power supply powering the light source by means of a cable connection.

According to a further aspect, the invention refers to an oven for preparing food. Said oven comprises an oven cavity and an oven door for closing the oven cavity. The oven door is configured according to the embodiments described above.

According to preferred embodiments, the light source is attached to the base body of the oven. The light source may be arranged such that the light emitted by the light source is provided to said printing, preferably by using said, preferably intermediate, door glass pane as a light wave guide.

According to a third aspect, the invention refers to a method for displaying information at an oven door of an oven, the oven door comprising a door glass window being at least partially transparent for enabling a user to look into the oven cavity, wherein the door window comprises at least one printing being made of an ink comprising scattering components, said ink being essentially transparent, wherein light is provided to the printing by means of a light source such that said light is scattered by the scattering components of said ink, thereby making the printing visible for a user in front of the oven door. In preferred embodiments the method of the invention comprises any of the features of the oven or of the oven door of the invention.

Information to be displayed by the optical user interface provided by the invention which is provided by the printing may take the form of any sign adapted to convey information, for example letters, icons or a combination of letters and an icon etc.

The terms "essentially", "substantially" or "approximately" as used herein with reference to any measured parameter is intended to mean deviations from any given value by approximately +/−10%, preferably by +/−5%, and—also with reference to any parameter of a more generic nature for which no measured values are indicated herein, e.g. transparency—is intended to mean deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
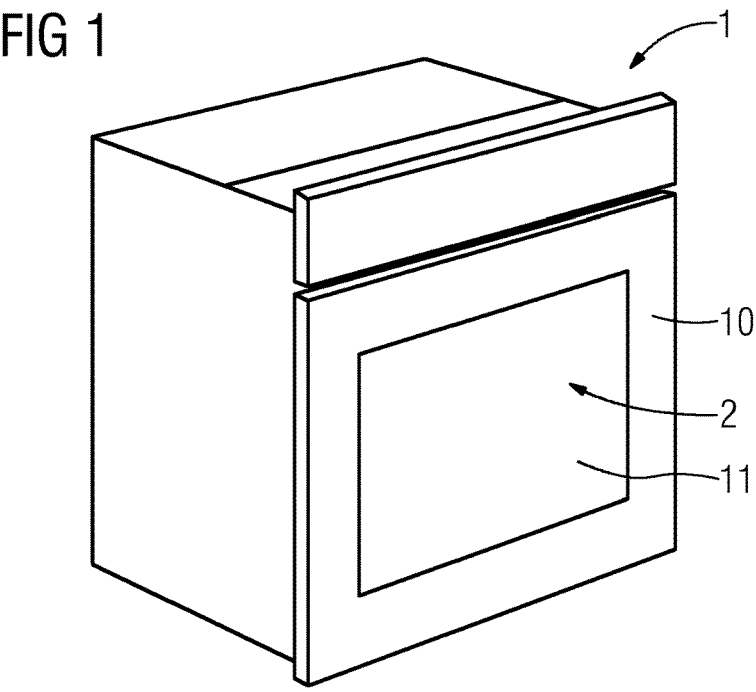
FIG. 1 shows an example schematic view of a baking oven.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic diagram of a baking oven 1. The baking oven 1 comprises an oven cavity 2 which is adapted to receive the food to be cooked and/or baked. The baking oven 1 further comprises an oven door 10 which can opened in order to place the food into the oven cavity 2 and closed in order to obtain a closed oven cavity 2.

Figure 2:
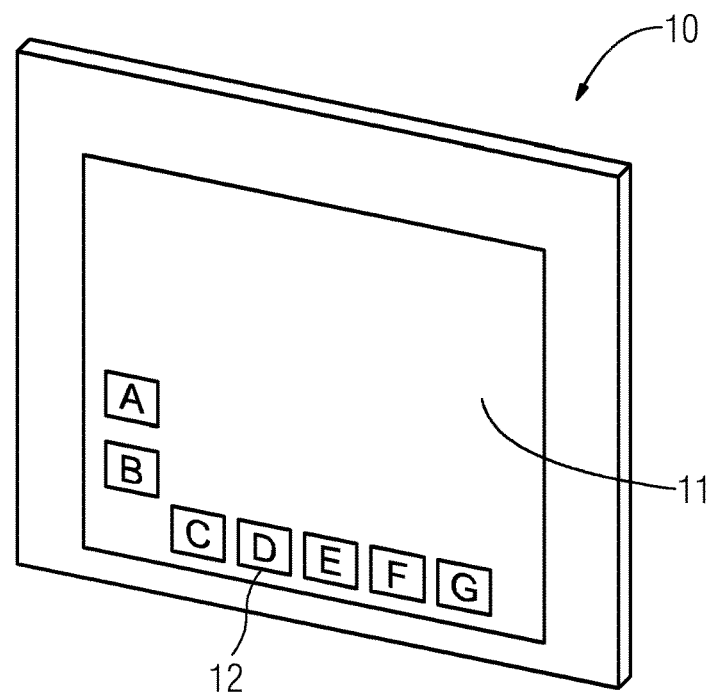
FIG. 2 shows an example schematic view of an oven door according to an embodiment.

FIG. 2 shows the oven door 10 in closer detail. The oven door 10 comprises a frame 10.1 which may border the oven door 10 circumferentially. The frame 10.1 may build the supporting structural element of the oven door 10, by means of which the oven door is attached to the base body of the oven 1. The oven door 10 further comprises a door window 11 which comprises at least one transparent glass pane in order to enable a user to look into the oven cavity 2 during the food preparation process without opening the oven door 10. A door glass pane may be made of any soda-lime glass, shock-resistant or a heat-resistant safety glass, low-energy glass with a heat-reflective coating or borosilicate glass, such as is per se known in the prior art.

The door window 11 comprises at least one printing 12. Said printing 12 may be directly applied to a glass pane 11.1, 11.2 or 11.3 of the door window 11. The printing 12 may comprise any information, for example, but without limiting character, a baking chart, baking level indication, heat up information, brand graphics, warnings, door temperature indication and/or door lock indication etc. Letters A to G indicate the information provided by the printing of FIG. 2. The printing 12 is transparent or essentially transparent. In other words, the printing 12 is not or only hardly recognizable if the printing 12 is not illuminated by lighting means described in the following.

The printing 12 may be made by applying at least one ink to a glass portion of the door window 11. The ink may comprise a basic component which is transparent or essentially transparent. In addition to said basic component, the ink comprises a scattering component. The scattering component may comprise particles with reflective surfaces. For example, said reflective particles may be ceramic particles.

Figure 3:
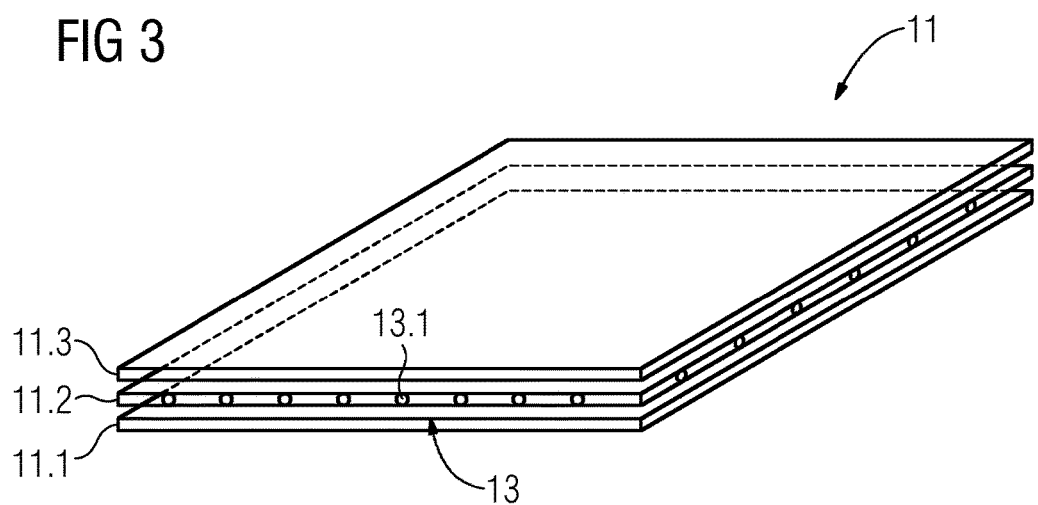
FIG. 3 shows a perspective view of a stack of door glass panes.

In order to make said printing, the oven 1 comprises a light source 13. As indicated in FIG. 3, the light source may comprise one, preferably multiple lighting means 13.1 said lighting means 13.1 may be, for example, light emitting diodes (LEDs). The lighting means 13.1 are arranged such that light emitted by the lighting means 13.1 is provided to the printing 12. The scattering component comprised in the ink of said printing 12 at least partially reflects said light to the outer side of the oven door 10 thereby making the printing 12 visible for a user in front of the oven door 10. More in detail, the light provided by the light source 13 is reflected by the reflective particles in a direction opposite to the oven cavity 2. By means of said scattered light, the printing 12 is visible for a person in front of the oven door 10.

FIG. 3 shows the arrangement of the light source 13 at the door window 11 in closer detail. In general, the light source 13 may be attached to or integrated in the oven door 10 or the light source 13 may be integrated in the base body of the oven cavity. The arrangement of the light source 13 is chosen such that the lighting means 13.1 are arranged at or along the edge of the door window 11, i.e. in vicinity to the transition area between the frame 10.1 and the door window 11. Furthermore, the arrangement of the lighting means 13.1 may be chosen such that the light emitted by the lighting means 13.1 is coupled into the door window 11, i.e. the main light emitting direction of the lighting means 13.1 may be parallel to the surface of the door glass pane. In other words, the door window 11 acts as a waveguide for the light emitted by the lighting means 13.1 in order to provide said light to said printing 12.

As shown in FIG. 3, the light source 13 comprises multiple lighting means 13.1. In addition, the door window 11 may comprise multiple printings 12. Each lighting means 13.1 may be associated with one or more printings 12 in order to illuminate said printing. For example, the light source 13 may be coupled with a control unit. The control unit may be adapted to switch on/switch off each lighting means 13.1 independently according to the currently chosen baking program or according to the temperature inside the oven cavity or according to any other information provided to the control unit (e.g. warning after occurrence of an error). For example, the LEDs may be multi-colour light emitting diodes. Thereby, by means of one light emitting diode, a plurality of information can be provided to the user based on the chosen light colour. The control unit may be adapted to control the colour of the LEDs according to the present oven function, temperature etc.

The door window 11 may comprise multiple glass panes 11.1, 11.2, 11.3 which are arranged essentially parallel to each other in a sandwich-like structure. Said glass panes are arranged at a distance to each other thereby confining a space between each other. Preferably, the door window 11 may comprise at least three glass panes, namely an inner glass pane 11.1 being adjacent to m the oven cavity 2, an intermediate glass pane 11.2 and an outer glass pane 11.3 forming the outer portion of the door window 11. The printing 12 can preferably be provided to the intermediate glass pane 11.2. In addition, the light source 13 may correspondingly also be preferably arranged at or located close to the intermediate glass pane 11.2. Thereby, the light source 13 is protected against dirt, humidity etc. by the inner glass pane 11.1 and/or the outer galls pane 11.3. In addition, the temperature at the intermediate window 11.2 can be effectively reduced by at least partially protecting the light source 13 by the inner glass pane 11.1 against heat impacts from the oven cavity 2.

In addition, to be able to keep the outer glass pane temperature as low as possible for user safety, the intermediate window 11.2 may comprise a thermo-protective layer.

Figure 4:
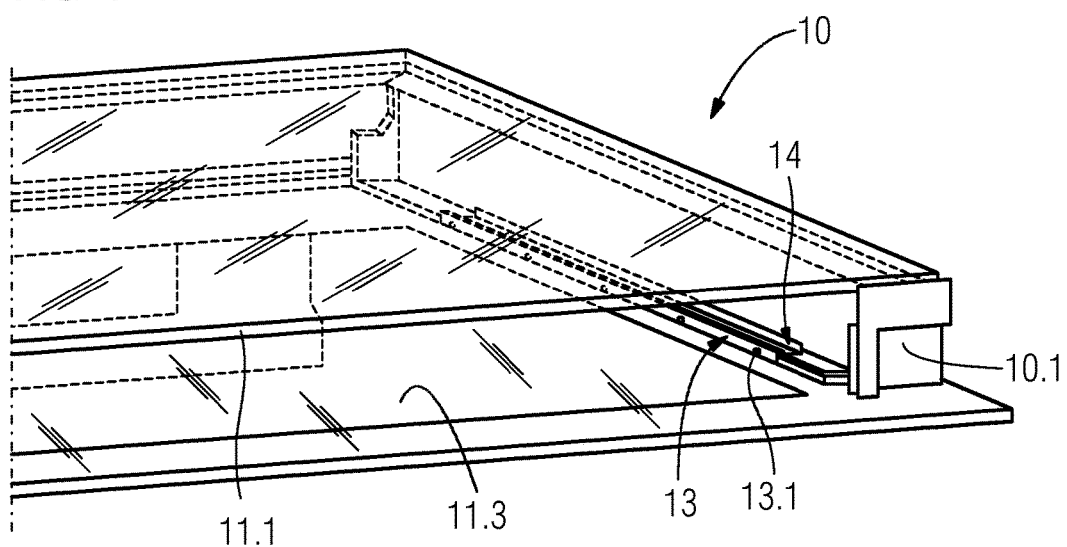
FIG. 4 shows a sectional perspective view of the oven door according to an embodiment.

FIG. 4 shows a sectional view of the oven door 10. The oven door 10 has a sandwich-like structure comprising an inner glass pane 11.1 which is directly facing the oven cavity 2 and an outer glass pane 11.3 being arranged at a distance to the inner glass pane 11.1 and forming at least partially the outer surface of the oven door 10. The oven door 10 may further comprise an intermediate glass pane 11.2 (not shown in FIG. 4).

The lighting means 13.1 may be arranged such that the light emitted by said lighting means is directly coupled into the edge of the intermediate glass pane (not shown in FIG. 4). The light source 13 comprising the lighting means 13.1 may be attached to the structural element or frame 10.1 of the oven door 10 by means of a support unit 14, in the following also referred to as fixing arrangement. More in detail, the support unit 14 may be attached to the side portion of the structural element. The support unit 14 may comprise support means for fixing one or more lighting means 13.1. For example, the lighting means 13.1 may be arrange at a circuit board comprising one or more light sources 13 (e.g. LEDs) and additional electronics for operating the light sources 13. Said circuit board may be fixed by the support unit 14. The support unit 14 may be arranged such that light is coupled into the edge of the intermediate glass pane 11.2. Alternatively, the light source 13 may be arranged in an aluminium housing comprising rips for dissipating heat or in a plastic housing comprising holes for enabling a heat exchange between the interior of the housing and the surrounding environment.

The intermediate glass pane 11.2 may be removably connected to the oven door 10. Thereby it is possible to remove the intermediate glass pane for cleaning purposes. For example, the intermediate glass pane may be slidably mounted at the frame 10.1 of the oven door 10. Thereby it is possible to pull out said intermediate glass pane 11.2 for cleaning purposes. In contrary to the intermediate glass pane 11.2, the light source 13, specifically the lighting means 13.1 may be fixly installed at the frame 10.1 of the oven door 10 or at the outer glass panel 11.3. Said installation is chosen such that the lighting means 13.1 are arranged close to the edge of the intermediate glass pane 11.2. Thereby the light emitted by the lighting means 13.1 is coupled into the intermediate glass pane 11.2 and guided by said intermediate glass pane 11.2 towards the printing 12 which is itself provided on said intermediate glass pane 11.2.

In order to avoid an overheating of the lighting means 13.1 or other electronics (for example T>=80° C.), an air circulation may be provided. For example, cool air may be conveyed to the lighting means 13.1 thereby avoiding an exceeding heat impact on the lighting means 13.1. For example, the frame 10.1 or other structural elements of the oven door 10 may comprise openings through which air is conveyed towards the lighting means 13.1, e.g. by means of a fan.

Alternatively, the light source 13 may be integrated into the base body of the oven 1. The lighting means 13.1 may be integrated such that the light emitted by said lighting means 13.1 is coupled into the door window 11 or the glass pane 11.1, 11.2 or 11.3 comprising the printing. In other words, the light source 13 is placed in the base body of the oven 1 directly underneath the bottom edge of the door window 11 or adjacent to the side edge of the door window 11. Thereby, no wiring between the base body of the oven 1 and the oven door 10 is necessary. In addition, the disassembling of the oven door 10 is simplified.

If the light source 13 is integrated in the door mechanical structure, the powering of said light source 13 may be obtained by a wireless power transfer technique. For example, the light source 13 may be powered by means of a pair of wireless power charging coils. More in detail, a power receiver coil may be attached to the oven door 10 and connected to the light source 13 whereas a power transmitting coil is arranged at oven base body or oven cavity, preferable at the bottom side of the oven base body or oven cavity. The power transmitting coil may be connected with a power supply of the oven and inductively coupled with the power receiver coil. There may be wireless power transmission between the power transmitting coil and power receiving coil in order to power the light source 13.

As already indicated above, the light source may be controlled by a control unit in order to provide a user interface. The information displayed by said user interface may be provided according to the current oven program. For example, the information according to the printing may be displayed in different colours according to the present oven program or information provided by a sensor unit. As an example, the printed information may be displayed in green colour when there is low temperature within the oven cavity 2 and in red colour when there is high temperature within the oven cavity 2. Furthermore, it is possible to provide a direct link between information provided at the oven door and information provided at the oven display. In addition it is possible to switch off the light source 13 during the cooking in order to provide an unhindered view into the oven cavity 2.

Above, embodiments of an oven door according to the present invention as defined in the appended claims have been described. These should be seen as merely non-limiting examples. As understood by a skilled person, many modifications and alternative embodiments are possible within the scope of the invention.

LIST OF REFERENCE NUMERALS

1 oven
2 oven cavity
10 oven door
10.1 frame
11 door window
11.1 inner glass pane
11.2 intermediate glass pane
11.3 outer glass pane
12 printing
13 light source
13.1 lighting means
14 support unit

The invention claimed is:

1. Oven door for closing a cavity of an oven comprising a door window being at least partially transparent for enabling a user to look into the oven cavity, wherein the door window comprises at least one printing made of an ink comprising scattering components, said ink being essentially transparent and wherein the oven door is adapted to provide light to the printing by at least one light source such that said light is scattered by scattering components of said printing thereby implementing an optical user interface for displaying information at the door window.

2. Oven door according to claim 1, wherein the scattering components are reflective particles.

3. Oven door according to claim 2, said reflective particles comprising ceramic particles.

4. Oven door according to claim 1, wherein the printing is adapted such that the information is essentially only visible when the printing is illuminated by said light source.

5. Oven door according to claim 1, wherein the window comprises at least one door glass pane that comprises said at least one printing and the light of said light source is coupled into the door window at at least one edge of the at least one door glass pane that comprises said printing and the light is guided by said door glass pane to said printing.

6. Oven door according to claim 1, wherein the door window comprises an outer glass pane, an inner glass pane and at least one intermediate glass pane arranged between the outer and inner glass panes, wherein the printing is applied to and the light is guided into said intermediate glass pane.

7. Oven door according to claim 6, wherein at least said intermediate glass pane is releasably secured at a mechanical structure of the oven door.

8. Oven door according to claim 7, wherein the light source is fixed to said mechanical structure of the oven door.

9. Oven door according to claim 8, said light source being fixed to a frame of said door.

10. Oven door according to claim 8, said light source being fixed at the outer glass panel of the oven door.

11. Oven door according to claim 1, wherein a fixing arrangement for fixing the light source is adapted to be cooled by an air flow flowing along or through the fixing arrangement.

12. Oven door according to claim 1, wherein the light source is cooled by an air stream flowing through the oven door.

13. Oven door according to claim 1, wherein the light source comprises a plurality of lighting means being arranged along an edge of the door window.

14. Oven door according to claim 1, wherein the light source is constituted by at least one single-colour or multi-colour light emitting diode, in particular wherein at least one light emitting diode has a high temperature resistance and/or at least one light emitting diode is provided with a programmable driver.

15. Oven door according to claim 14, wherein at least one said light emitting diode has a high temperature resistance up to essentially 150° C.

16. Oven door according to claim 1, wherein the light source is powered by means of a wireless power charging coil and/or the light source is subjected to pulse-width modulation (PWM).

17. Oven door according to claim 1, wherein the door window comprises:
- an inner pane, an intermediate pane and an outer pane,
- the at least one printing comprises first and second printings on said intermediate pane, said first and second printings being provided from one or more inks comprising scattering components that scatter light upon illumination thereof, wherein the first and second printings are essentially transparent and non-visible from in front of said oven when not illuminated but visible from in front of said oven when illuminated, the first printing providing first information or an indication of a first operative condition of the oven and the second printing providing second information or an indication of a second operative condition of said oven, and
- the at least one light source comprises a first LED light source associated with said first printing and a second LED light source associated with said second printing, said first and second LED light sources each being arranged so as to deliver light therefrom into said intermediate glass pane from at least one edge thereof so that said intermediate glass pane acts as a waveguide to direct light from the respective light source to its associated printing in order to illuminate that printing, said first and second LED light sources being independently controlled by a control unit of the oven in order to illuminate one or both of them in response to one or more sensed conditions or operative cooking programs, said first LED light source being driven via a programmable driver that modifies the color and/or intensity of light emitted therefrom to convey a range of said first information or a range of said indication of said first operative condition via variable illumination of the first printing.

18. Oven door according to claim 17, said first and second LED light sources being fixed within said oven door or integrated in a body of the oven cavity such that they are arranged at or along said at least one edge of said intermediate pane during operation, said intermediate pane being removably coupled to said door so that said intermediate pane can be removed from the door for cleaning without disturbing or requiring disconnection from said first and second LED light sources.

19. Oven door according to claim 17, said scattering particles comprising ceramic particles.

20. Oven door according to claim 17, wherein a user can switch off said first and second LED light sources during operation in order to provide an unhindered view through said window into the oven cavity.

21. Oven for preparing food comprising an oven cavity and the oven door according to claim 1 for closing the oven cavity.

22. Oven according to claim 21, wherein the light source is attached to a base body of the oven.

23. Method for displaying information at an oven door of an oven, the oven door comprising a door window being at least partially transparent for enabling a user to look into the oven cavity, wherein the door window comprises at least one printing, the printing being made of an ink comprising scattering components, said ink being essentially transparent, wherein light is provided to the printing by means of a light source such that said light is scattered by the scattering components of said printing thereby making the printing visible for a user in front of the oven door.

* * * * *